Jan. 20, 1953     A. M. MacFARLAND     2,626,295

DRY CELL BATTERY

Filed April 19, 1950

INVENTOR.
ALLISON MACFARLAND

BY Bosworth & Sessions
ATTORNEYS

Patented Jan. 20, 1953

2,626,295

UNITED STATES PATENT OFFICE 2,626,295

DRY CELL BATTERY

Allison M. MacFarland, Cleveland, Ohio, assignor to General Dry Batteries, Inc., Lakewood, Ohio, a corporation of Ohio Application April 19, 1950, Serial No. 156,878

1 Claim. (Cl. 136—111)

This invention relates to dry cell batteries and more particularly to multiple cell batteries of the wafer type, i. e., comprising a stack of thin cells, batteries of this sort being used to a large extent in hearing aids, miniature radios and like services where compact batteries of relatively high voltages are required.

A general object of the present invention is the provision of compact wafer type batteries which can be manufactured at reasonable cost, which have improved capacity and life with respect to the volume they occupy and which are substantially free from troubles caused by short circuiting and leakage of fluid between cells.

Briefly, I accomplish the foregoing and other more detailed objects of the invention by providing a battery in which the several cells are separated from each other primarily by the impervious zinc anodes of the cells and in which the casing enclosing the battery is made up of a series of annular frame members which are telescoped together and arranged to provide shoulders upon which the flat zinc anodes are supported, each anode being compressed against the shoulder of one frame member by another frame member. The marginal edge portions of separators composed of battery paper or the like and disposed in contact with the anodes are also compressed by the frame members, the battery paper acting, in effect, as a gasket to prevent leakage of electrolyte around the edges of the zinc anode and between adjacent cells. The parts are retained in position with the anodes and associated sheets of battery paper held compressed by the frame members which are secured together to provide an impervious casing or enclosure.

Figure 1:
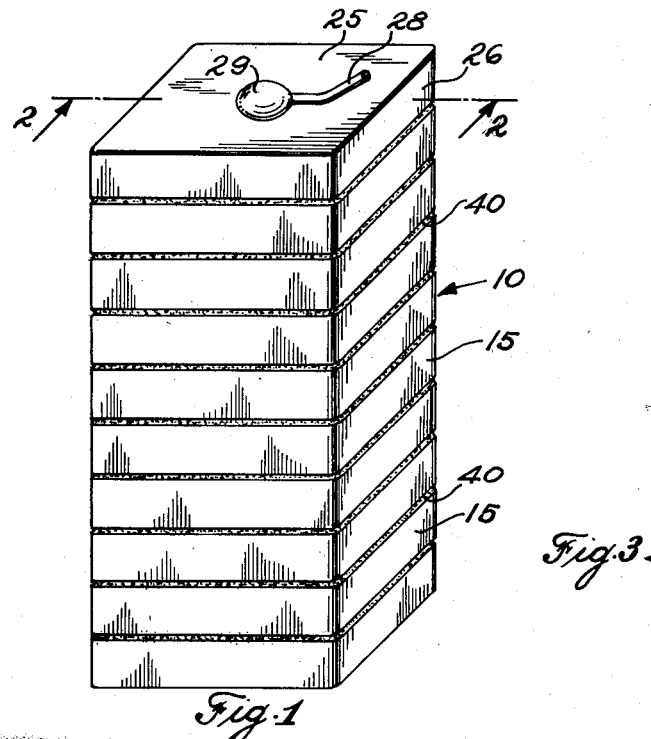
Figure 2:
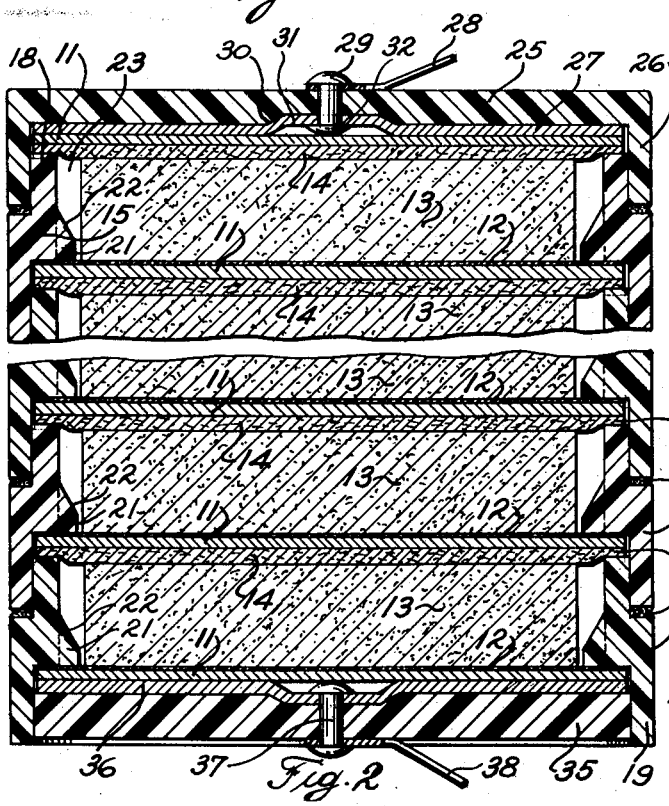

Referring now to the drawing in which a preferred form of the invention is illustrated, Figure 1 is a perspective of a battery embodying the invention; Figure 2 is a vertical sectional view of the battery shown in Figure 1; and Figure 3 is an exploded view showing the several parts making up the battery of Figures 1 and 2.

In the drawings a battery embodying my invention is shown in general at 10 and comprises a series of groups of cell elements stacked together in series relation to provide a battery. A comparatively small number of cells are shown in the battery illustrated, but ordinarily the stacks are made up of 15 or more cells to provide batteries of the desired voltage.

Figure 3:
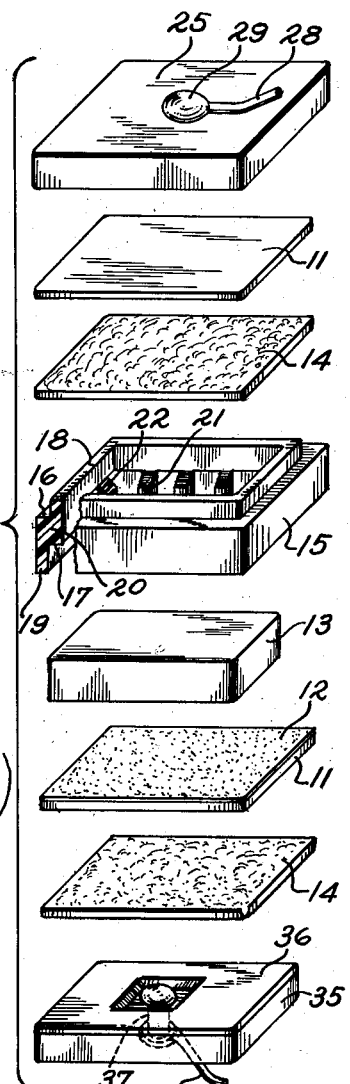

The arrangement of the elements in the battery is shown in Figure 2 while the elements making up the cells are shown separately in Figure 3. Each of the cells of the battery embodies a flat zinc plate 11 constituting the anode of the cell, the plate being provided on one side with a carbonaceous coating 12 composed of varnish, lacquer or the like made conductive by the incorporation of finely divided carbon or the like therein, the carbon constituting the cathode of the immediately adjacent cell. Thus each coated zinc plate 11 and its coating 12 acts as the anode of one cell and the cathode of another. The plates and the battery as a whole are shown as rectangular in the drawings, but it will be understood that the cell elements may be round or of other shape if desired.

Each cell also embodies the usual depolarizing mix in the form of a cake 13, one face of which engages the carbonaceous coating 12 of the cell while the other face engages the separator 14; separator 14 preferably is composed of fibrous material such as one or more sheets of battery paper impregnated or coated with electrolyte and engaging the face of the anode 11 opposite the carbonaceous coating 12. It will be noted that the separators substantially coincide with the zinc anodes 11, extending to the edges thereof.

In order properly to space and support the elements of the cells with respect to each other in the stack, as well as to form a casing or housing, annular frame members 15 are provided, a frame member being associated with and surrounding the edges of each group of cell elements. The frame members are open at both ends and are preferably molded of a thermoplastic insulating material that will resist the action of the electrolyte and which is capable of being cemented readily, preferably by means of a solvent. Cellulose acetate butyrate plastics, for example, are suitable.

As shown particularly in Figure 3, each frame member 15 has an intermediate stepped portion, thus providing an exterior shoulder 16 and an interior shoulder 17, these being defined by the inner upwardly extending flange 18 and the outer downwardly extending flange 19. The flanges 18 and 19 are dimensioned so that the flanges of adjacent frame members telescope together as shown in Figure 2. The mid or body portion 20 of each frame member preferably has a series of inwardly extending lugs 21, the upper surfaces of which are preferably tapered as at 22; these lugs function in the assembled battery to center the mix cakes 13, leaving spaces around the periphery of the mix cakes as indicated at 23 in Figure 2. The ribs prevent undue lateral displacement of the mix cake when they are being compressed in the assembly process, while the spaces provide room for some expansion of the mix cake laterally during the operation of assembling the battery and to accommodate growth of the mix cake while the battery is in service. Lateral expansion of the mix cakes cannot short circuit the battery, inasmuch as the sides of the mix cakes are surrounded by the insulating frame members.

In the assembled battery the shoulders 17 of the frame members provide ledges or supports against which the carbon coated zinc elements 11 are compressed by engagement of the inner flanges 18 of adjacent frame members with the marginal edge portions of the paper separators 14 associated with each mix cake. Thus adjacent frame members have opposed clamping surfaces between which the marginal edges of the plates and separators are compressed.

It will be noted that in the assembled battery the dimensions of the parts are such that the outer flanges 19 of the frame members do not engage the exterior shoulders 16 of adjacent frame members. Flanges 19 and shoulders 16 do not act as stop members, rather the telescoping together of the frame members is limited by the interposed carbon coated zinc elements 11 and battery paper separators 14. In assembling the battery pressure can be exerted on these parts so that the marginal edges of the paper separators act in effect as gaskets to prevent leakage of electrolyte from one cell to an adjacent cell around the edges of the zinc plates. The compression results in a reduction in thickness of the battery paper as illustrated somewhat diagrammatically at 14a in Figure 2 of the drawings. In order to insure a proper seal, the battery paper 14 is preferably substantially thicker than the paper ordinarily employed (i. e., paper having a thickness of from 0.020 inch to 0.030 inch may be used whereas the usual battery paper is from 0.005 inch to 0.010 inch in thickness). Furthermore, the paper is preferably softened by moistening before assembly so that it can be compressed more readily into sealing relationship with the frame members. Obviously the zinc plates themselves act as barriers to the passage of electrolyte throughout the major areas of the cells and with the path around the edges of the zinc plates blocked, intermingling of electrolyte of adjacent cells is effectively prevented.

In order to provide the zinc or positive terminal for the battery and to enclose the upper end of the battery, a top closure or terminal cap 25 is employed. Cap 25 has a depending annular flange 26 that engages the upwardly extending flange 18 of the uppermost frame member 15. The cap 25 also carries a zinc terminal plate 27 which is secured to the cap and to the external terminal member 28 by means of a rivet 29. The cap 25 and plate 27 are centrally indented as shown at 30 and 31 to provide space for the head 32 of rivet 29. Plate 27 makes contact with the zinc plate 11 of the uppermost cell; the carbonaceous coating is omitted from this plate. Thus the terminal 28 is electrically connected to the uppermost zinc plate 11 through the rivet 29 and terminal plate 27 and becomes the zinc or negative terminal of the battery.

In order to enclose the bottom of the battery and to provide the carbon or positive terminal, the closure disk 35, which fits snugly within the downwardly extending flange 19 of the lowermost frame member 15, is employed. A zinc terminal plate 36 is secured by rivet 37 to the disk 35 and to the external terminal 38. Disk 35 and plate 36 are centrally recessed in the same manner as cap 25 and plate 27 to receive the head of rivet 37. Plate 36 directly engages the lowermost zinc plate 11, the coating 12 of which constitutes the carbon of the lowermost cell of the battery. Inasmuch as there is no battery paper engaging the lowermost zinc plate 11, the external terminal 38 is electrically connected to the lowermost carbon coating 12 through its associated plate 11, the terminal plate 36 and rivet 37 and becomes the carbon or positive terminal of the battery. Both the disk 35 and the cap 25 are preferably composed of the same plastic material that is used to produce frame members 15.

In assembling the parts to provide a battery, the several elements are stacked together as shown, the mix cakes being initially of slightly greater thickness than required to take up the spacing between the series of zinc plates. Then sufficient pressure is applied to the ends of the stack to bring the cell elements firmly into contact with each other, the pressure, where necessary, flattening the mix cakes slightly and at the same time expanding them laterally. The pressure exerted also securely clamps the marginal edges of the zinc plates and paper separators between the opposed clamping surfaces of the frame members. While the parts are held in correct assembled relation, the assembly is dipped into a solution of cement which preferably is merely a volatile solvent for the plastic employed to make the frame and end members. The solvent penetrates the spaces between the frame members, and between the top frame member and the cap 25 and between the lowermost frame member and the disk 35. The assembly is then removed from the solvent and permitted to dry to bond the parts into an integrally joined assembly. In some instances an additional dip in a varnish or wax to provide a protective coating may be desirable. In any event, in the completed battery the spaces are preferably substantially filled with plastic as indicated at 40, and the several frame members and the cap 25 and disk 35 are bonded together into a continuous, electrolyte-impervious casing.

By this construction, a simple and compact battery is provided. Inasmuch as the frame members are bonded together into an impervious and strong casing, the need for a separate enclosure for the battery is eliminated, and thus the active elements of the battery can be increased in size with respect to the volume occupied by the battery; this is an important factor in batteries for small hearing aids and miniature radios where space is at a premium.

The assembling operation can be carried out rapidly and economically because the zinc plates with their carbon coatings and the battery paper separators are centered properly by engagement with the frame members while the inwardly extending lugs center the mix cakes within the frame members. Ordinarily no cementing is required in the initial assembly operations. The compressive forces exerted on the carbon coated zinc plates and the battery paper separators by the flange 18 and shoulders 17 are sufficient to create adequate seals at the edges of the zinc plates, thus providing an effective barrier against passage of electrolyte around the edges of the zinc plates and between the adjacent cell elements. By this construction the need for electrolyte-proof wrappings, integuments, trays and the like for the individual cells is eliminated, thus resulting in a further gain in space for the active components of the cells.

Those skilled in the art will appreciate that various changes and modifications can be made in the invention without departing from the spirit or scope thereof. It is therefore to be understood that the description of the preferred form of the invention appearing herein is given by way of example and not by way of limitation. It is intended that the patentable features of the invention shall be covered by the appended claim.

I claim:

A dry cell battery embodying a plurality of groups of cell elements arranged in series stacked relation, each group including a flat zinc electrode, a conductive carbonaceous coating on one side of said zinc electrode, a sheet of battery paper impregnated with electrolyte coinciding with said zinc electrode and engaging the side of said zinc electrode opposite said carbonaceous coating, and a mix cake having one face engaging said sheet of battery paper and its other face engaging the carbonaceous coating of zinc electrode of the adjacent group, and a casing for the battery made up of a series of open-ended frame members, the unobstructed openings through said frame members being of substantially the same cross sectional area as the mix cakes one frame member surrounding each group of cell elements, each frame member having an intermediate stepped portion providing an exterior shoulder and an interior shoulder and having inwardly extending spaced tapered lugs centering the mix cake within the frame and providing space for expansion thereof, an inner flange and an outer flange, the inner flange having external dimensions substantially the same as the internal dimensions of the outer flange, the flanges of adjacent frame members in the casing being telescoped together, ends of the internal flanges opposing internal shoulders and the ends of the external flanges opposing external shoulders, the marginal edges of a zinc electrode and the sheet of battery paper associated therewith being compressed between each opposed internal shoulder and end of internal flange, the opposed external shoulder and ends of external flanges being slightly spaced apart, said frame members being bonded together into an electrolyte-impervious casing.

ALLISON M. MacFARLAND.

REFERENCES CITED

The following references are of record in the file of this patent:

UNITED STATES PATENTS

| Number | Name | Date |
|---|---|---|
| 1,916,698 | Storey | July 4, 1933 |
| 2,144,574 | MacCallum | Jan. 17, 1939 |
| 2,418,442 | Wiencke | Apr. 1, 1947 |
| 2,496,709 | Gelardin | Feb. 7, 1950 |
| 2,521,800 | Martinez et al. | Sept. 12, 1950 |
| 2,526,789 | Woodring | Oct. 24, 1950 |